(12) United States Patent
Broderick (10) Patent No.: US 12,277,474 B2
(45) Date of Patent: Apr. 15, 2025

(54) TOGGLING MODES OF OPERATING A RING SCANNER BASED ON ORIENTATION

(71) Applicant: INFINITE PERIPHERALS, INC., Irvine, CA (US)

(72) Inventor: John Broderick, Corona, CA (US)

(73) Assignee: INFINITE PERIPHERALS, INC., Irvine, CA (US)

( * ) Notice: Subject to any disclaimer, the term of this patent is extended or adjusted under 35 U.S.C. 154(b) by 0 days.

(21) Appl. No.: 18/386,713

(22) Filed: Nov. 3, 2023

(65) Prior Publication Data

US 2024/0152711 A1 May 9, 2024

Related U.S. Application Data

(60) Provisional application No. 63/422,245, filed on Nov. 3, 2022.

(51) Int. Cl.
*G06K 7/10* (2006.01)
(52) U.S. Cl.
CPC ............................ *G06K 7/10891* (2013.01)

(58) Field of Classification Search
CPC .................................................. G06K 7/10891
USPC ...................................................... 235/472.01
See application file for complete search history.

(56) References Cited

U.S. PATENT DOCUMENTS

| | | | |
|---|---|---|---|
| 8,371,505 B1* | 2/2013 | Zolotov | G06K 7/1404 235/462.24 |
| 10,970,507 B1* | 4/2021 | Cornell | G06K 7/10821 |
| 2022/0261094 A1* | 8/2022 | Cole | G06F 3/0202 |
| 2022/0325999 A1* | 10/2022 | Koumaras | G06K 19/06028 |
| 2023/0033636 A1* | 2/2023 | Krishna Mohan | B25J 9/1669 |
| 2023/0267290 A1* | 8/2023 | Vargas | G06K 7/10881 235/472.01 |

* cited by examiner

*Primary Examiner* — Allyson N Trail
(74) *Attorney, Agent, or Firm* — Sterne, Kessler, Goldstein & Fox P.L.L.C.

(57) ABSTRACT

A ring scanner is disclosed. The ring scanner is configured to determine an inclination angle of the ring scanner with respect to a ground and based on the inclination angle set an operating mode for the ring scanner, where the operating mode includes either a communication mode or a scanning mode.

20 Claims, 9 Drawing Sheets

TOGGLING MODES OF OPERATING A RING SCANNER BASED ON ORIENTATION

CROSS-REFERENCE TO RELATED APPLICATIONS

This application claims the benefit of U.S. Provisional Application 63/422,245, filed on Nov. 3, 2022, the contents of which is incorporated by reference herein in its entirety.

BACKGROUND

Field

The field is generally related to scanning devices.

Related Art

Optical labels, such as barcodes, represent data in a visual, machine-readable format. One type of barcode, known as linear or one-dimensional (1D) barcodes, can represent data by varying the widths and spacing of parallel lines. Another type of barcode, known as matrix codes, two-dimensional (2D) barcodes, or QR codes, use rectangles, dots, hexagons and other patterns to represent data.

Barcodes have many applications. In stores, universal product code (UPC) barcodes are pre-printed on most items and are used for inventory and to check out. Barcodes are used in healthcare and hospital settings, for things like patient identification (to access patient data, including medical history, drug allergies, etc.). They can also be used to keep track of objects and people; they are used to keep track of rental cars, airline luggage, nuclear waste, registered mail, express mail and parcels. Barcoded tickets allow the holder to enter sports arenas, cinemas, theatres, fairgrounds, and transportation, and are used to record the arrival and departure of vehicles from rental facilities, etc.

A barcode reader (or barcode scanner) is an optical scanner that can read printed barcodes, decode the data contained in the barcode and send the data to a computer. One type of handheld scanner is gripped in a user's palm. With these handheld barcode scanners, the user encloses the handle with all five fingers and uses the trigger button to activate the scanner, like the operation of a handgun. One downside of handheld barcode scanners is that the user of the scanner has to put down the scanner to use his hand. If the user is transporting packages or taking inventory, having to repeatedly put down and pick up the scanner can result in lost productivity.

To reduce this inefficiency, ring scanners operate by looping around at least one finger, enabling an operator to continue using both hands while carrying the scanner. In this way, workers can continue to use both hands when climbing ladders or stairs, handling large items, or operating machinery.

Ring scanners, however, often lack the ability to present data to the operator. In some cases, if output is needed for the operator, it may be presented in a separate display that the operator might not even be viewing. In one example operation, a postage worker may be scanning packages and some subset of those packages may be flagged for the postage worker to take aside for further inspection. In the postage worker example, there may be a separate display that displays data when the worker scans a package that needs special treatment.

Another capability that ring scanners do not have is the ability to serve as multifunctional devices. For example, ring scanners are typically only designed to scan items. However, they lack the capability to enable certain types of communications between people or entities. For example, they do not allow two warehouse workers or postal workers working in the same facility to communicate directly with one another. Such communication may be desired if people within the same warehouse or facility want to coordinate regarding items that are scanned.

To address these issues, improved rings scanners are needed.

BRIEF SUMMARY

Systems, methods, and non-transitory computer readable media are disclosed for a ring scanner that can toggle/switch between operating modes. The toggling/switching is based on how the ring scanner is oriented. In aspects, the ring scanner can use a motion sensor in combination with software and/or other components to determine the ring scanner's orientation. Using an inclination angle (i.e., an angle indicating what position an optical scanner of the ring scanner is facing relative to the ground), the ring scanner can determine its orientation and set an operating mode. The operating mode can include a communication mode or a scanning mode.

In aspects, the operating mode may be set to the communication mode when the inclination angle is equal to or between 90 degrees and 80 degrees. In aspects, the operating mode may be set to the scanning mode when the inclination angle is equal to or between 80 degrees and −30 degrees.

In aspects, when in the communication mode the ring scanner can operate as a telephone. In other aspects, when in the communication mode the ring scanner can operate as a walkie-talkie. In aspects, when operating as a walkie-talkie, the ring scanner can record a voice recording based on selection of a center button of the ring scanner. In aspects, when operating as a walkie-talkie, the ring scanner can replay a last transmission received based on selection of a left button of the ring scanner. In aspects, if the left button is selected several times such that several of the previous recordings are replayed, if a right button of the ring scanner is selected, the ring scanner can skip forward to the more recent messages. In this way, messages may be recorded, stored, and played back by a user/operator of the ring scanner. In aspects, if operating as a telephone, the buttons of the ring scanner, when selected, may be used to accept, decline, or make phone calls. In aspects, if operating in the scanning mode, the ring scanner may be used to scan barcodes or take images of objects.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements. The drawings are illustrative and may not be to scale.

DETAILED DESCRIPTION

Prior art ring scanners are limited in their interactivity. For the most part, the ring scanners lack output display devices or input devices, and instead rely on external devices, perhaps strapped to the user's forearm. Aspects have integrated interactivity, including a touchscreen display and separate buttons that may be used to operate an optical scanner integrated with the ring scanner, and input data into an integrated computing device of the ring scanner.

In aspects, the ring scanner can also change its operating mode based on its orientation. The ring scanner can use a motion sensor in combination with software and/or other components to determine the ring scanner's orientation. Using an inclination angle (i.e., an angle indicating at what position an optical scanner of the ring scanner is facing relative to the ground), the ring scanner can determine its orientation and set an operating mode. The operating mode can include a communication mode or a scanning mode.

Conventional ring scanners do not have this type of functionality. Typically, ring scanners are meant to be used for one purpose, which is to scan barcodes. The ability of the disclosed ring scanner to switch modes of operation based on its orientation is a novel feature. It provides the ring scanner more robust capabilities. A user can change the position of the ring scanner and have the ring scanner operate in a new mode.

The operating modes can include a communication mode and a scanning mode. The scanning mode refers to a mode in which the ring scanner operates to scan barcodes or scan images of items. The communication mode refers to a mode in which the ring scanner operates to allow voice communication between entities or people. For example, the communication mode can allow the ring scanner to be used as a walkie-talkie or as a telephone. This capability is novel because conventional ring scanners do not allow direct person-to-person or entity-to-entity voice communication. Thus, the disclosed ring scanner provides a functionality that does not currently exist in conventional ring scanners. This added functionality improves the current state of the art by providing more robust ring scanners.

Ring Scanner Architecture

Figure 1A:
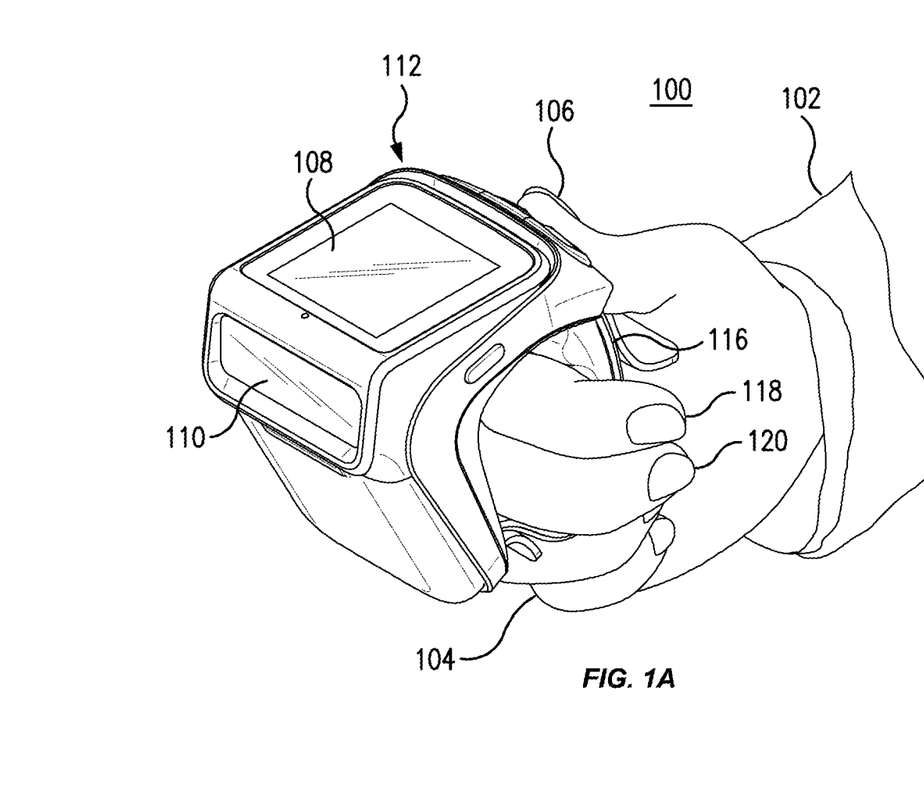
FIGS. 1A and 1B are diagrams illustrating a ring scanner in operation, according to aspects.
Figure 1B:
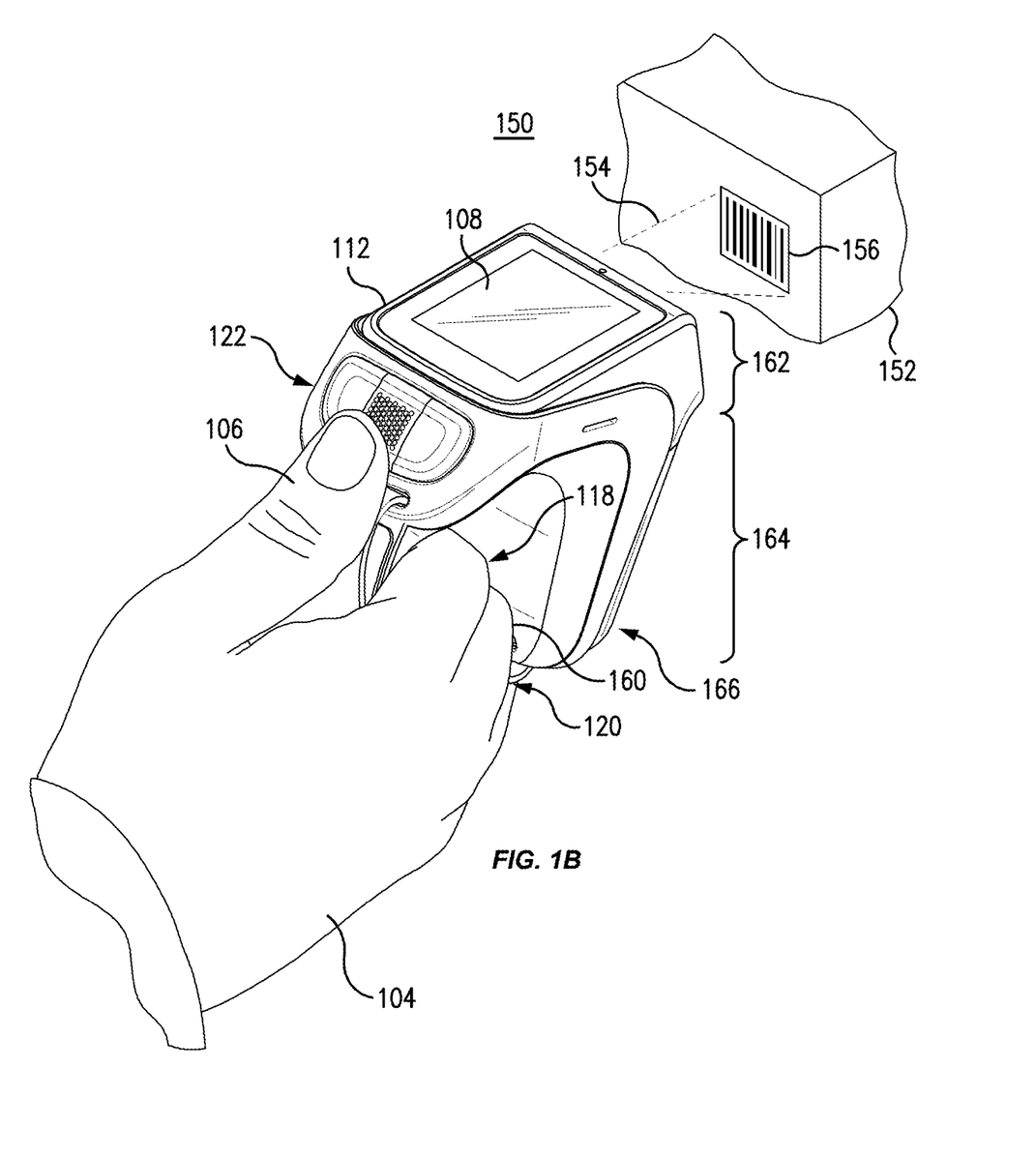

FIGS. 1A and 1B are diagrams illustrating a ring scanner in operation, according to aspects. FIG. 1A shows a diagram 100 with a user/operator having a hand 104 and forearm 102. Hand 104 is gripping a ring scanner 112. Ring scanner 112 has a display 108 and an optical scanner 110.

As may be seen in diagram 100, ring scanner 112 has a loop 116 through which an index finger 118 and a middle finger 120 pass through to grip and hold ring scanner 112. Loop 116 is configured to be gripped by index finger 118 and middle finger 120. It presses against the palmar side of index finger 118 and middle finger 120. Because loop 116 enables an operator to grip ring scanner 112 with just a loop around the operator's fingers, the operator maintains use of his or her hands. For example, the operator can continue to use his or her hands to operate equipment, carry packages, and climb ladders.

According to an aspect, loop 116 is configured to be gripped by index finger 118 and middle finger 120 such that the palm is in a neutral position when the optical detector is oriented in an upright direction. In this way, a user need not pronate the hand when transitioning from using the hand to grip a package from the package's side to scanning the optical label. The user's forearm 102 need not twist when scanning. Avoiding twisting in this way, the operator can avoid fatigue, discomfort, pain, and even possible injury.

Display 108 is an output device for presentation of information in visual form. It outputs information that is supplied to it from a computing device (not shown) in ring scanner 112 by converting electrical signals into light. In different aspects, display 108 may be an electroluminescent (ELD) display, liquid crystal display (LCD), light-emitting diode (LED) backlit LCD, thin-film transistor (TFT) LCD, light-emitting diode (LED) display, OLED display, AMOLED display, plasma (PDP) display, quantum dot (QLED) display, or electronic paper, such as E INK paper available from E Ink Corporation of Cambridge, Massachusetts.

Optical scanner 110 is an optical scanner that can read printed optical labels such as barcodes or can scan images of objects or take pictures of the objects, decode the data contained in the optical label, and send the data to a computer. It may include a light source, a lens, and a light sensor translating for optical impulses into electrical signals. In different aspects, optical scanner 110 may be a pen-type reader, a laser scanner, a charge-coupled device (CCD) reader, a light emitting diode (LED) scanner, a camera-based reader, a video camera reader, a large field-of-view reader, or an omnidirectional barcode scanner.

FIG. 1B shows a diagram 150 illustrating ring scanner 112 from a different perspective. As shown in diagram 100, ring scanner 112 is in this position to project light 154 to capture a barcode 156 on package 152.

As shown in diagram 150, barcode 156 is oriented in a horizontal direction, read left to right or right to left. Barcode 156 is a linear dimensional (1D), one dimensional barcode with its lines running vertical to ground. In other aspects, barcode 156 may be two-dimensional and use rectangles, dots, hexagons and other patterns. In other aspects, the package 152 itself may be scanned as an image/picture.

As shown in diagram 150, when positioned to capture barcode 156 in an upright direction the user's palm of hand 104 is oriented substantially vertically. The palm of hand 104 is orthogonal to the ground.

As shown in diagram 150, ring scanner 112 includes a body piece 166, which includes an upper body portion 162 and a lower body 164. Upper body portion 162 rests on a portion of index finger 118 facing a thumb 106 of hand 104. Lower body 164 covers a dorsal side of index finger 118 and middle finger 120 of hand 104. Upper body portion 162 and lower body 164 are affixed to one another and angled to cover at least a portion of the thumb-facing side of index finger 118 and the dorsal side of middle finger 120. Together with loop 116, upper body portion 162 and lower body portion 164 encircle index finger 118 and middle finger 120. More specifically, together with loop 116 (labeled in FIG.

1A), upper body portion 162 and lower body 164 may encircle a middle phalanx portion index finger 118 and middle finger 120.

Upper body portion 162 includes a plurality of buttons 122 that, when selected, causes ring scanner 112 to perform certain actions. Each of the plurality of buttons 122 may be a switch mechanism with a surface that may be depressed, or pushed, by a finger. When the surface is depressed an electrical signal is sent to input information and possibly trigger an action. Each of the plurality of buttons 122 may have a spring to return to their un-pushed state. Other types of buttons may be used as well, such as virtual buttons presented on a touchscreen display.

As will be described below, the plurality of buttons 122 may cause optical scanner 110 to activate and scan barcode 156 or may input data into a computing device controlling aspects of ring scanner 112. The plurality of buttons 122 are positioned on ring scanner 112 to be selected by thumb 106.

In particular, buttons 122 are positioned to be selected by thumb 106 when hand 104 is gripping a ring scanner 112, and index finger 118 and middle finger 120 are bent. According to an aspect, buttons 122 are positioned to be selected when index finger 118 and middle finger 120 are bent at a proximal interphalangeal joint 160. Proximal interphalangeal joint 160 sits between a middle phalanx and proximal phalanx of index finger 118 and middle finger 120. Bending at proximal interphalangeal joint 160 may be more ergonomical than bending other joints, such as the metacarpophalangeal joint of index finger 118 and middle finger 120.

Display 108 may be a touchscreen display. A touchscreen display is an assembly of both an input (touch panel) and output (display) device. The touch panel may be layered on the top of the output electronic visual display. A user can give input, or can control a computing device (not shown) in ring scanner 112 through simple or multi-touch gestures by touching the screen with a special stylus or one or more fingers. In different examples, a touch panel may be a resistive touchscreen panel, a surface acoustic wave (SAW) touch panel, a capacitive touchscreen panel, or an infrared touchscreen panel.

When display 108 is a touchscreen display, display 108 will also be positioned such that at least a portion of display 108 may be selected by thumb 106 when hand 104 is gripping a ring scanner 112, and index finger 118 and middle finger 120 are bent at the proximal interphalangeal joint 160. Display 108 is configured to output visually from the computing device.

Figure 2A:
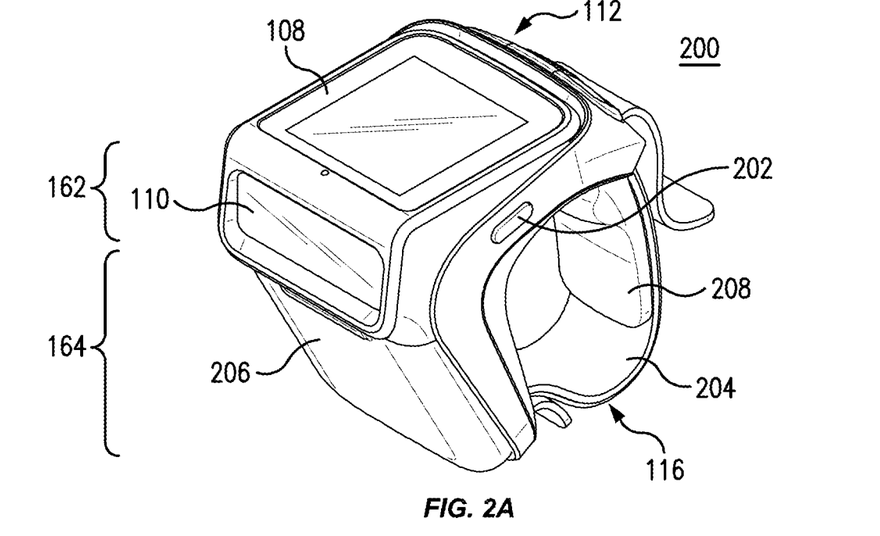
FIGS. 2A and 2B are schematic diagrams illustrating the ring scanner in greater detail, according to aspects.
Figure 2B:
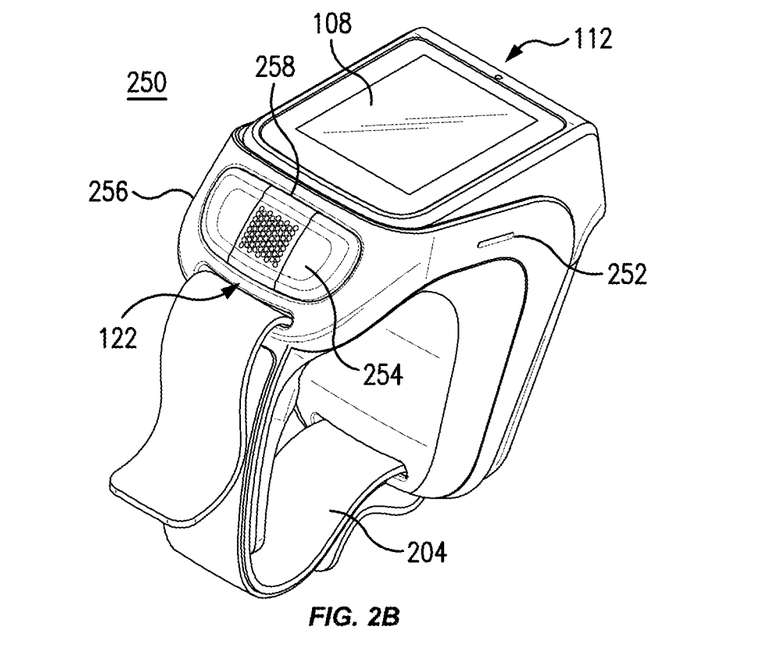

FIGS. 2A and 2B are schematic diagrams illustrating the ring scanner 112 in greater detail, according to aspects. FIG. 2A illustrates a front three-quarter view 200 of ring scanner 112. As shown from this perspective, ring scanner 112 includes a battery 206, power button 202, strap 204, and semi-rigid portion 208.

Battery 206 is a device including one or more electrochemical cells to provide power for ring scanner 112. In an example, battery 206 may be a lithium-ion battery. According to an aspect, battery 206 may be removable so that it may be swapped out with fully charged batteries when battery 206 is depleted. Additionally or alternatively, battery 206 could be internal to device 212 and not removable. Battery 206 may be rechargeable.

Power button 202 is a button that, when selected, causes ring scanner 112 to power on or off. When ring scanner 112 powers on, electricity is delivered from battery 206 to components of ring scanner 112, such as optical scanner 110, display 108, and other hardware components as will be discussed in greater detail with respect to FIG. 4.

Strap 204 is a ribbon used to fasten ring scanner 112 to the operator's fingers. As described above, strap 204, in conjunction with other components of ring scanner 112 may encircle an operator's fingers. Strap 204 may be made of nylon webbing, leather or other flexible materials. It also may be an adjustable strap positioned to encircle the at least one finger.

Semi-rigid portion 208 protrudes from upper portion 162 and is situated behind strap 204, in particular between strap 204 and the operator's fingers (not shown). Semi-rigid portion 208 may be flexible such that, as strap 204 is tightened, the tightened strap may pull semi-rigid portion 208 to tighten on the operator's fingers. Semi-rigid portion 208 may serve to allow strap 204 to be tightened, enabling the operator to maintain a tight grip on ring scanner 112 without irritating the operator's fingers. In an aspect, semi-rigid portion 208 may be made of rubber or a rubber-like material. In illustrative examples, semi-rigid portion 208 may be made of Thermoplastic Polyurethane (TPU), Thermoplastic Elastomer (TPE), butyl (IIR), nitrile (NBR), Neoprene® (CR), Ethylene Propylene Diene Monomer (EPDM), Silicone (Q), or Viton®.

FIG. 2B illustrates a rear three-quarter view 250 of ring scanner 112. As may be seen from this perspective, ring scanner 112 includes a speaker 252 and plurality of buttons 122.

Speaker 252 is a device which converts an electrical audio signal into a corresponding audible sound. Example speakers include moving-iron loudspeakers, piezoelectric speakers, magnetostatic loudspeakers, electrostatic loudspeakers, ribbon and planar magnetic loudspeakers, bending wave loudspeakers, flat panel loudspeakers, Heil air motion transducers, transparent ionic conduction speakers, plasma arc speakers, thermoacoustic speakers, rotary woofers, moving-coil, electrostatic, electret, planar magnetic, and balanced armature. The speaker 252 can also include a microphone integrated therewith to receive audio inputs.

As illustrated in FIG. 2B, buttons 122 includes three buttons: left button 256, right button 254, and center button 258. Left and right buttons (256 and 254) may input selections into a computing device (not shown) in ring scanner 112. This may cause an action to be specified by an application executed by the computing device. In one example, the application may display a menu on display 108 and selecting buttons 254 and 256 may enable a user to navigate through lists or menus. In this way, aspects enable interactive applications to be executed by the ring scanner 112.

Center button 258 is configured to, when selected, activate optical scanner 110 to read a barcode or scan an image. It also may send input data to the computing device of the ring scanner 112.

Left button 256, right button 254, and center button 258 can also be used in a communication mode of the ring scanner 112. For example, selecting each of these buttons can provide a different functionality when the ring scanner 112 is in the communication mode. The functionality can include, for example, enabling/disabling a telephone call, enabling recording of a voice message, skipping forward and backward through voice messages, etc.

Figure 3:
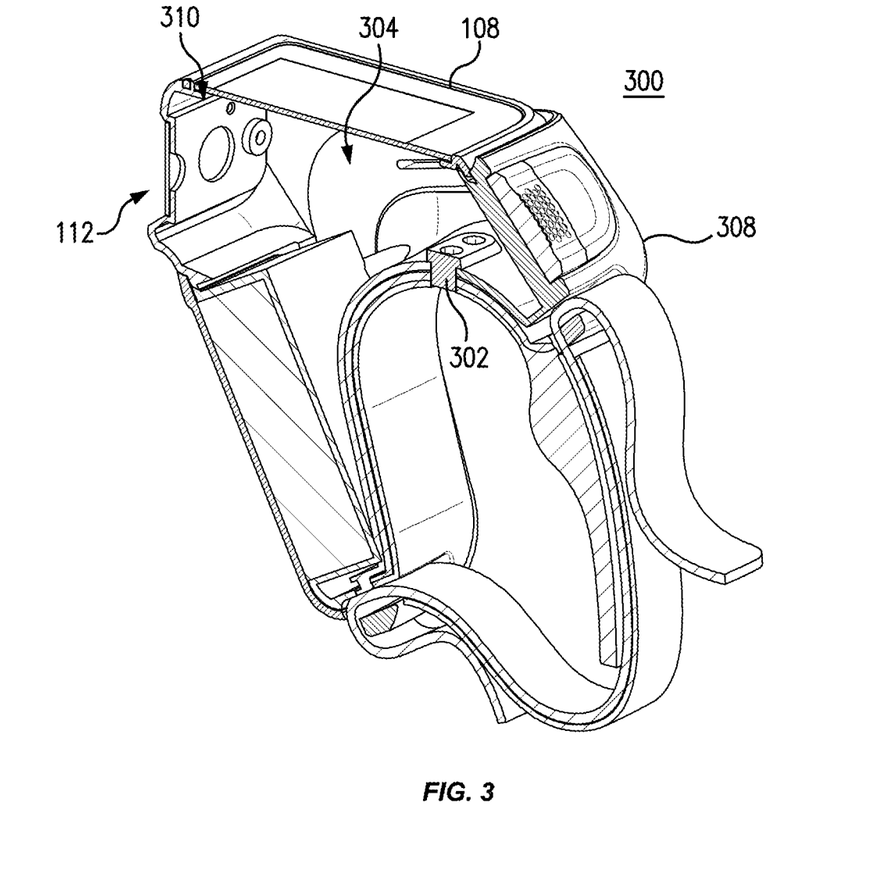
FIG. 3 is a cross section of the ring scanner, according to aspects.

FIG. 3 is a cross section of the ring scanner 112, according to aspects. Housing 308 is a protective exterior (e.g., shell) or an enclosing structural element (e.g., chassis or exoskeleton) designed to enable easier handling, provide attachment points for internal mechanisms (e.g., mounting brackets for electrical components, cables, and pipings), maintain cleanliness of the contents by shielding dirt/dust, fouling and other contaminations, or protect interior mechanisms (e.g., delicate integrated electrical fittings) from structural stress and/or potential physical damage.

Figure 4:
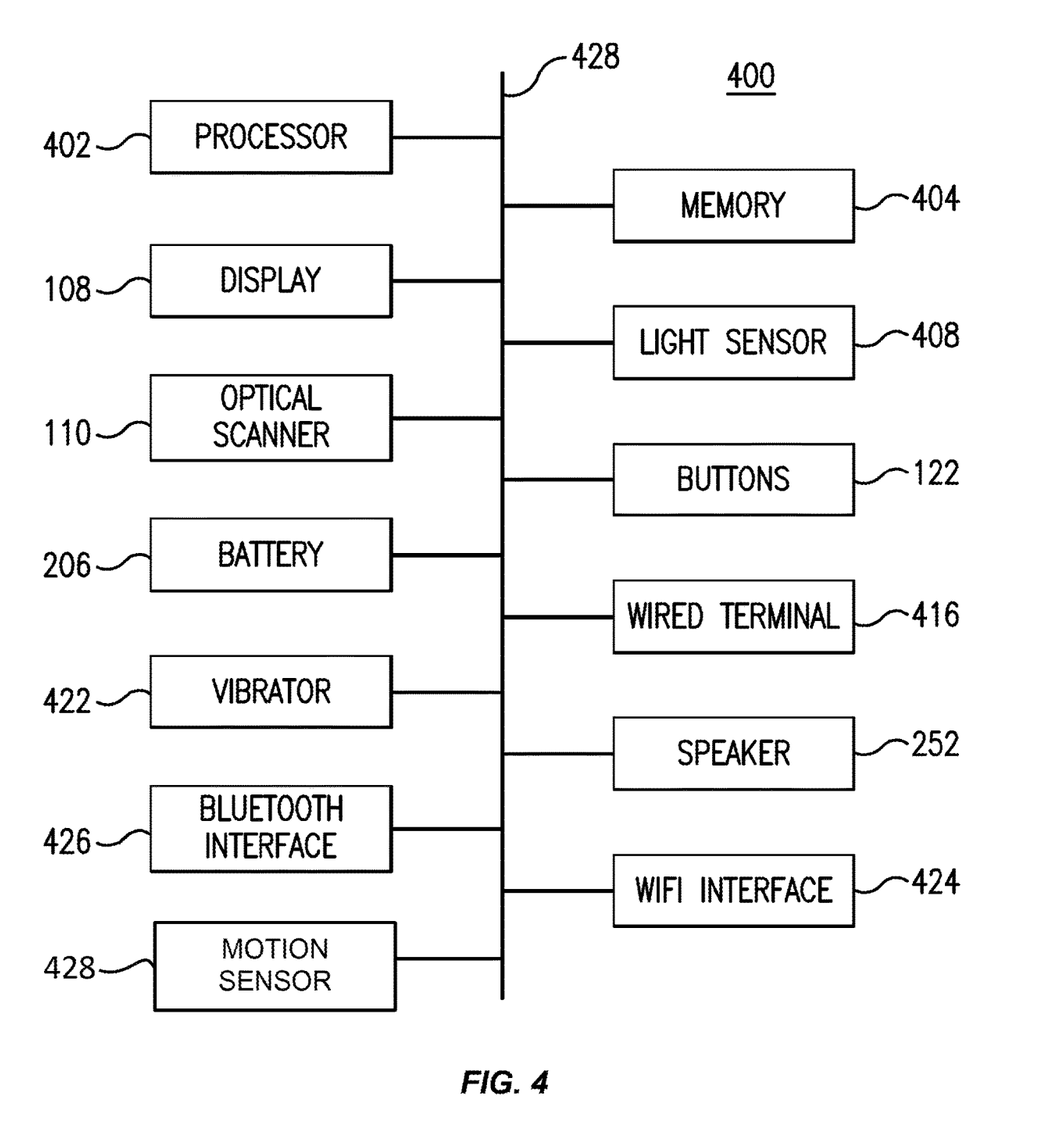
FIG. 4 is an architecture diagram illustrating hardware components of the ring scanner, according to aspects.

The interior of housing 308 includes a cavity 304 that contains various electronic components, as illustrated in FIG. 4. Housing 308 includes an opening 310, display 108, and other openings, such as an opening for a charging port 302 when charging the battery 206.

Charging port 302 is configured to electrically couple ring scanner 112 to a cradle, and positioned directed toward the loop 116. Charging port 302 may be a USB port as discussed with respect to FIG. 4 below. Ring scanner 112 may include at least one magnet (not shown) positioned to align the charging port to the cradle to enable electrical coupling.

Alternatively or additionally, ring scanner 112 may be capable of wireless charging. For example, ring scanner 112 may have a silicon chip that receives a beacon signal to charge the device. For example, the chip may enable a power transmitter to locate a device and transmit power directly to the device, along the path used to detect the chip. This path based functionality may allow the wireless power transmitter to continuously and safely send power when needed. In examples, ring scanner 112 may use the COTA power transmitter/receiver available from Ossia Inc. of Bellevue, WA or the WattUp power transmitter/receiver available from Energous Corporation.

FIG. 4 is an architecture diagram 400 illustrating hardware components of the ring scanner 112, according to aspects. As discussed with respect to previous figures, diagram 400 includes display 108, optical scanner 110, buttons 122, battery 206, and speaker 252. In addition to those components, diagram 400 includes a processor 402, memory 404, light sensor 408, wired terminal 416, vibrator 422, Bluetooth interface 426, Wi-Fi interface 424, and a motion sensor 428. Each of these components of FIG. 4 is enclosed within housing 308 shown in FIG. 3.

Bus 428 is a communication system that transfers data between the hardware components of a ring scanner 112. In addition to transferring data, bus 428 may also transfer electrical power, such as from battery 206 to other components. In this way, bus 428 communicatively and electrically couples the various components.

It may be appreciated for those skilled in the art that a plurality of signal lines or buses may exist, thus different components may be linked by different signal lines or buses, and that a signal line or bus depicted in the schematic diagram may represent a plurality of such.

Memory 404 may include random access memory (RAM) and may also include nonvolatile memory, such as read only memory (ROM) and/or flash memory. Memory 404 may be embodied as an independent memory component, and may also be embedded in another component, such as processor 402, or may be embodied as a combination of independent as well as embedded, and/or a plurality of memory components. Memory 404 is adapted to include software modules (a module is a set of instructions).

Processor 402 is adapted to run instructions stored in memory 404. Processor 402 may be a micro-controller unit (MCU), a digital signal processor (DSP) and/or an Image/Video Processing unit or the like components that run instructions. An example of an MCU is MSP432P401x, available from Texas Instruments Inc. of Dallas, Texas. An example of a DSP is C5000, available from Texas Instruments Inc. An example of an image/video processor is OMAP3525, available from Texas Instruments Inc. One or more processors may be present. Processor 402 may be an independent component; it may also be embedded in another component, such as in light sensor/camera 408, or any combination thereof.

Wired terminal 416 is adapted to attach to a wired network, including, but not limited to, Ethernet, USB, or thunderbolt.

Diagram 400 includes two wireless interfaces, Wi-Fi interface 424 and Bluetooth interface 426. Wi-Fi interface 424 may provide a network interface accessible by applications running on processor 402. Bluetooth interface 426 may be adapted to enable the ring scanner 112 to interact with peripheral devices, such as headsets (not shown).

Light sensor 408 is a photodetector. It is a sensor of light. A photo detector has a p-n junction that converts light photons into current. The absorbed photons make electron-hole pairs in the depletion region. Photodiodes and phototransistors are a few examples of photo detectors. In a different example, light sensor 408 may be a photoemission or photoelectric effect photodetector, thermal photodetectors, polarization photodetectors, or photochemical photodetectors. Light sensor 408 may be integrated into a camera of the ring scanner 112.

In an example operation, light sensor 408 may signal to processor 402 when light is detected. Processor 402, in turn, may adjust the brightness of display 108. Automatically adjusting brightness in this way may have the effect of conserving power in battery 206.

Vibrator 422 is a device that causes vibration when receiving a specified signal from processor 402. Vibrator 422 is a mechanical device to generate vibrations. To generate the vibrations, vibrator 422 may include an electric motor with an unbalanced mass on its driveshaft. Vibrator 422 may be a vibrating structure gyroscope implemented as a microelectromechanical system (MEMS).

Speaker 252 is coupled to processor 402 and is configured to cause the ring scanner 112 to emit sound as specified by commands from processor 402. In this way, speaker 252 may provide audio to a user of the ring scanner 112 as specified by an application executed on processor 402. In aspects, a microphone can be integrated with the speaker 252 to allow the speaker 252 to also receive audio inputs. For example, speaker 252 can function to receive audio inputs to allow the ring scanner 112 to operate as a walkie-talkie or as a telephone. For example, in aspects the Wi-Fi interface 424 and/or Bluetooth interface 426 can couple to the speaker 252 and can allow the ring scanner 112 to operate as a phone or walkie-talkie using voice over IP (VoIP) technologies, or may be integrated into cellular/telephony circuitry installed on the ring scanner 112 to allow the ring scanner 112 to integrate telephone operations and capabilities.

The buttons 122 may send commands to the processor 402, or other components such as optical scanner 110. When a user presses one of the buttons 122, a signal may be sent to processor 402. That signal may cause an interrupt command in the software application executed by processor 402, causing processor 402 to run specific commands that an application specifies to correspond to that button input. In this way, using buttons 122, a user can trigger actions as specified by the application executed by processor 402.

In response to inputs it receives from buttons 122, processor 402 can output information to display 108 as specified by a software application executed by processor 402. In addition, as mentioned above, display 108 may be a touch-screen display. In this way, interactive applications may be implemented within the ring scanner 112.

In addition, not shown, other input devices may be included, such as a radiofrequency identification (RFID) reader and a near field communication (NFC) reader. RFID uses electromagnetic fields to automatically identify and track tags attached to objects. An RFID system consists of a tiny radio transponder, a radio receiver and transmitter. When triggered by an electromagnetic interrogation pulse from RFID reader, an RFID tag transmits digital data back to the reader. A NFC reader may allow for collection of payment data from an EMV chip or from a user's mobile device (not shown).

In examples, these NFC and RFID readers may be used for login purposes. An operator can swipe her badge in the vicinity of a ring scanner 112 having these features and the ring scanner 112 can log her in using the information received from the NFC chip or the badge. Then, when the operator is using the ring scanner 112, any scanned items are tracked with an identification of the operator who logged into the ring scanner 112.

Motion sensor 428 may be part of a circuitry or a standalone component that can detect the orientation of the ring scanner 112. For example, the motion sensor 428 may be an accelerometer, gyroscope, or a combination thereof that can by itself, or as part of an integrated circuit, determine the orientation of the ring scanner 112 in a three-dimensional space. For example, in aspects, the motion sensor 428 can detect an inclination angle of the ring scanner 112 to measure the orientation of the ring scanner 112 with respect to the ground. The inclination angle refers to the angle between the front plane that the optical scanner 110 is facing and the X-axis, where the X axis is parallel to the ground. In aspects, the detection of the inclination angle and determining what the angle is can allow the ring scanner to set an operating mode.

Toggling Between Operating Modes of a Ring Scanner

Figure 5:
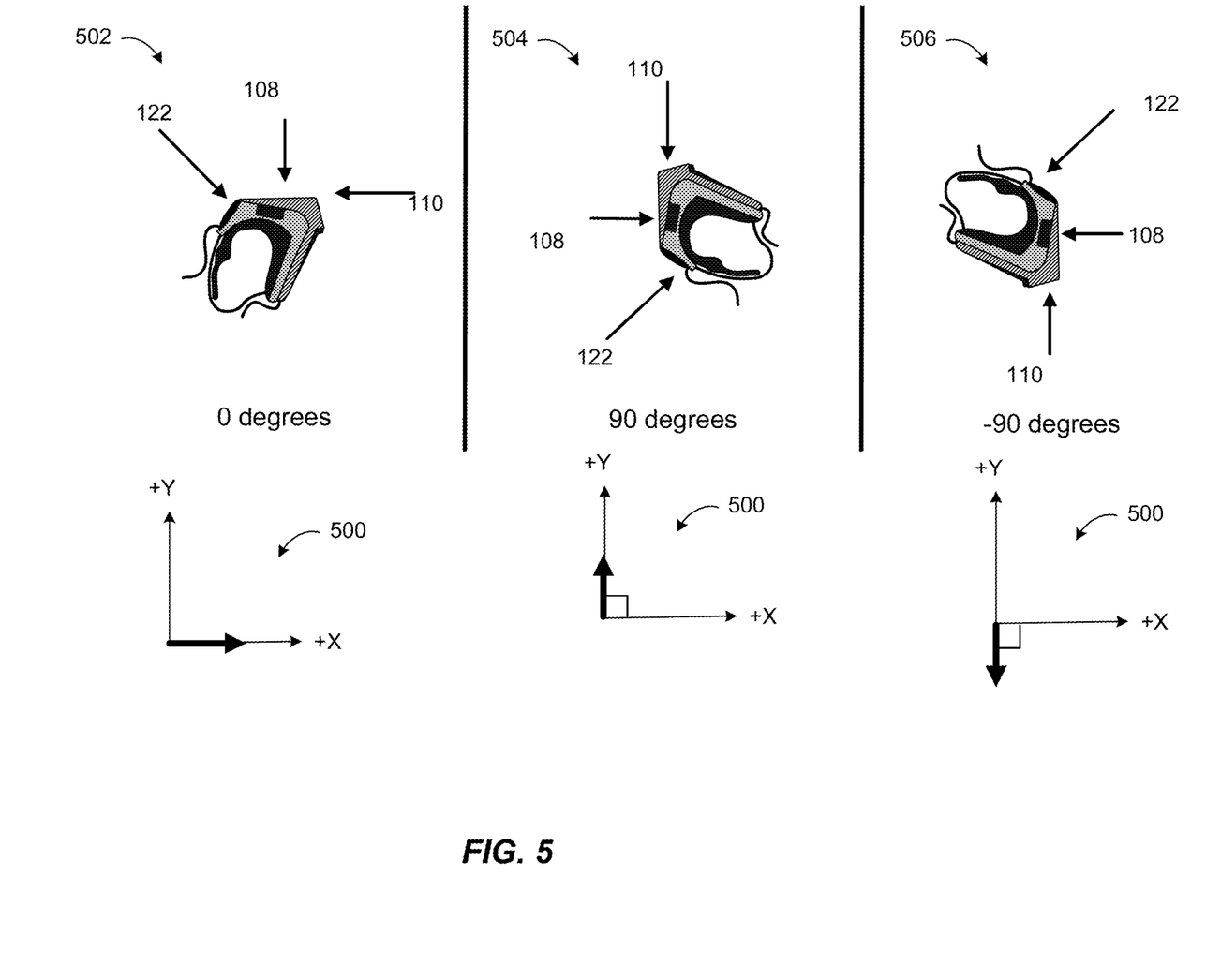
FIG. 5 is a diagram showing different orientations of the ring scanner that can result in toggling between various modes of operation, according to aspects.

FIG. 5 is a diagram showing different orientations of the ring scanner 112 that can result in toggling between various modes of operation, according to aspects. FIG. 5 shows three different orientations. For the purposes of FIG. 5 it is assumed that the ground is parallel to the X-axis shown in X-Y coordinate plane 500. The toggling can be performed when the motion sensor 428 measures the inclination angle of the ring scanner 112. The measured inclination angle can then be transmitted to one or more processors (e.g., processor 402) of the ring scanner 112, which can execute software code stored on a non-transitory computer readable medium (e.g., memory 404), that when executed can determine the mode the ring scanner 112 should be operating in based on the inclination angle. A person of ordinary skill in the art will know how to implement code to perform such functions by reading this disclosure, so the implementation details will not be discussed in detail.

Orientation 502 shows the ring scanner 112 having its optical scanner 110 facing in the positive direction of the X-axis. Thus, in orientation 502, the inclination angle is zero degrees. Orientation 504 shows the ring scanner 112 having its optical scanner 110 facing in the positive direction of the Y-axis. Thus, in orientation 504, the inclination angle is 90 degrees. Orientation 506 shows the ring scanner 112 having its optical scanner 110 facing in the negative direction along the Y-axis. Thus, in orientation 506, the inclination angle is −90 degrees.

In aspects, each of these different inclination angles can result in different operation modes for the ring scanner 112. For example, in aspects, the ring scanner 112 may be pre-configured such that different inclination angles or different ranges of inclination angles can result in different modes of operation. For example, in one aspect, ranges can be set such that if the inclination angle is equal to or between 90 degrees and 80 degrees, the ring scanner 112 can operate in a communication mode. Having the ring scanner 112 operate in the communication mode based on an inclination angle equal to or between 90 degrees and 80 degrees is sensible because it allows the speaker 252 and microphone to be close to the user/operator's mouth and ears so that if the user/operator listens to or speaks into the ring scanner 112 he or she can easily hear audio messages or record messages into the ring scanner 112.

If, however, the inclination angle is equal to or between 80 degrees and −30 degrees, the ring scanner 112 can operate in a scanning mode. Having the ring scanner 112 operate in the scanning mode based on an inclination angle equal to or between 80 degrees and −30 degrees is sensible because it allows the optical scanner 110 to be pointed at objects to perform the scanning and/or image taking functions.

Finally, if the inclination angle is equal to or between −30 degrees and −90 degrees, the ring scanner 112 can operate in a standby mode. The standby mode refers to an operating mode where the ring scanner 112 does not scan or communicate and can be in a frozen or standby state and/or in a low power mode to conserve energy. Having the ring scanner 112 operate in the standby mode based on an inclination angle equal to or between −30 degrees and −90 degrees is sensible because typically having the optical scanner 110 at an inclination angle in this range indicates that it is neither being used for scanning items/barcodes because a user/operator is likely not going to scan items or barcodes by pointing the ring scanner 112 at such an angle, nor is it being used for communications because the ring scanner 112 is far from a user/operator's mouth and ears. Therefore, this inclination angle indicates that the ring scanner 112 is likely not being used for anything.

The aforementioned angles are merely exemplary. A designer of the ring scanner can vary the inclination angles to different values for the operating modes.

Figure 6:
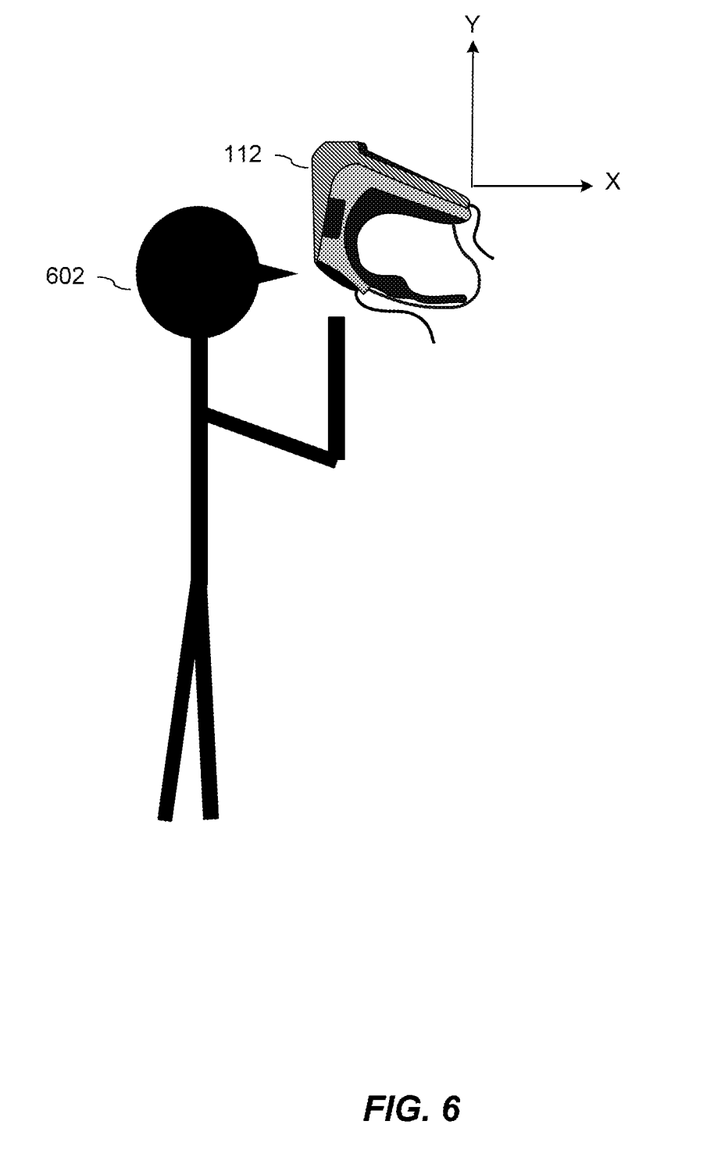
FIG. 6 is a diagram showing the ring scanner in an orientation that triggers a communication mode, according to aspects.

FIG. 6 is a diagram showing the ring scanner 112 in an orientation that triggers the communication mode, according to aspects. FIG. 6 shows user/operator 602 holding the ring scanner 112 at an inclination angle equal to or between 90 degrees and 80 degree. As shown, the ring scanner 112 is close to the user/operator's 602 mouth and ears so that the user/operator 602 can speak into the microphone and/or listen to audio messages received from the speaker 252. As indicated, when in the communication mode the ring scanner can operate as a telephone. In other aspects, when in the communication mode the ring scanner can operate as a walkie-talkie. In aspects, when operating as a walkie-talkie, the ring scanner can record a voice recording based on selection of one or more buttons 122 of the ring scanner 112. For example, selection of the center button 258 of the ring scanner can enable the ring scanner 112 to record a voice recording. The voice recording can be saved in the memory of the ring scanner 112 and/or transmitted to other devices, for example, other ring scanners or to servers to be distributed or broadcast to other devices, people, etc. In aspects, when operating as a walkie-talkie, the ring scanner 112 can also replay voice messages received. For example, the ring scanner 112 can replay a last transmission received based on selection of a left button 256 of the ring scanner 112. In aspects, if the left button 256 is selected several times such that several of the previous recordings are replayed, if a right button 254 of the ring scanner 112 is selected, the ring scanner can skip forward to the more recent messages. Thus, when functioning as a walkie-talkie, messages may be recorded, stored, and played back by a user/operator 602 of the ring scanner 112.

In aspects, if operating as a telephone, the buttons of the ring scanner 112, when selected, may be used to accept, decline, or make phone calls. For example, in aspects, the left button 256 and/or right button 254 can be used to scroll through lists of contacts. Once a contact is found that the user/operator 602 would like to call, the center button 258 can be used to initiate the call. In aspects, the center button 258 can also be used to end/terminate the call or reject an incoming call.

Figure 7:
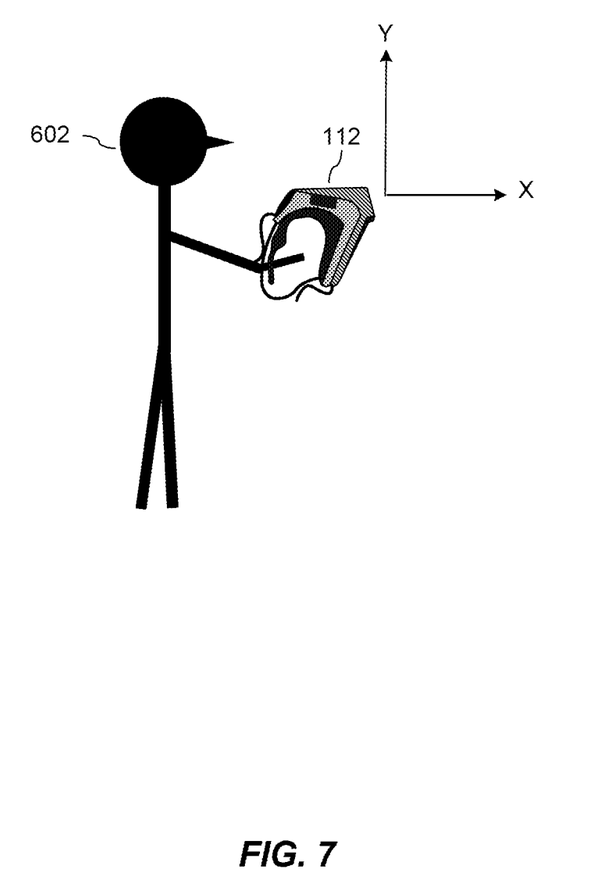
FIG. 7 is a diagram showing the ring scanner in an orientation that triggers a scanning mode, according to aspects.

FIG. 7 is a diagram showing the ring scanner 112 in an orientation that triggers a scanning mode, according to aspects. FIG. 7 shows user/operator 602 holding the ring scanner 112 at an inclination angle equal to or between 80 degrees and −30 degrees. In this mode, the ring scanner 112 can revert to a mode in which it is ready to scan barcodes and images using the optical scanner 110. In aspects, the buttons 122 can be used to trigger the scanning/image taking functions. For example, the center button 258 can be used to initiate a scan or initiate taking of an image of an item or barcode.

The functions described in FIGS. 1-7 may be implemented as instructions stored on a non-transitory computer readable medium to be executed by one or more computing devices such as the processor 402, a special purpose computer, an integrated circuit, integrated circuit cores, or a combination thereof of the ring scanner 112. The non-transitory computer readable medium may be implemented with any number of memory units, such as a volatile memory, a nonvolatile memory, an internal memory, an external memory, or a combination thereof. The non-transitory computer readable medium may be integrated as a part of the ring scanner 112, or installed as a removable portion of the ring scanner 112.

The processes with respect to the ring scanner 112 described above improves the state of the art from previous ring scanners because it introduces a novel ring scanner 112 that is able to automatically toggle between operating modes. In aspects, the ring scanner 112 can change its operating mode based on its orientation. The ring scanner 112 can use a motion sensor 428 in combination with software and/or other components to determine the ring scanner's 112 orientation. Using the inclination angle, the ring scanner 112 can determine its orientation and set an operating mode. The operating mode can include a communication mode or a scanning mode.

Conventional ring scanners do not have this type of functionality. Typically, ring scanners are meant to be used for one purpose, which is to scan barcodes. The ability of the disclosed ring scanner 112 to switch modes of operation based on orientation is a novel feature. It provides the ring scanner 112 more robust capabilities than is typically provided by ring scanners. A user/operator can change the position of the ring scanner 112 and have the ring scanner 112 operate in a new mode, which is convenient because it can provide a touchless experience to the user/operator such that the user/operator does not need to manually select operating modes of the ring scanner 112.

Methods of Operation

Figure 8:
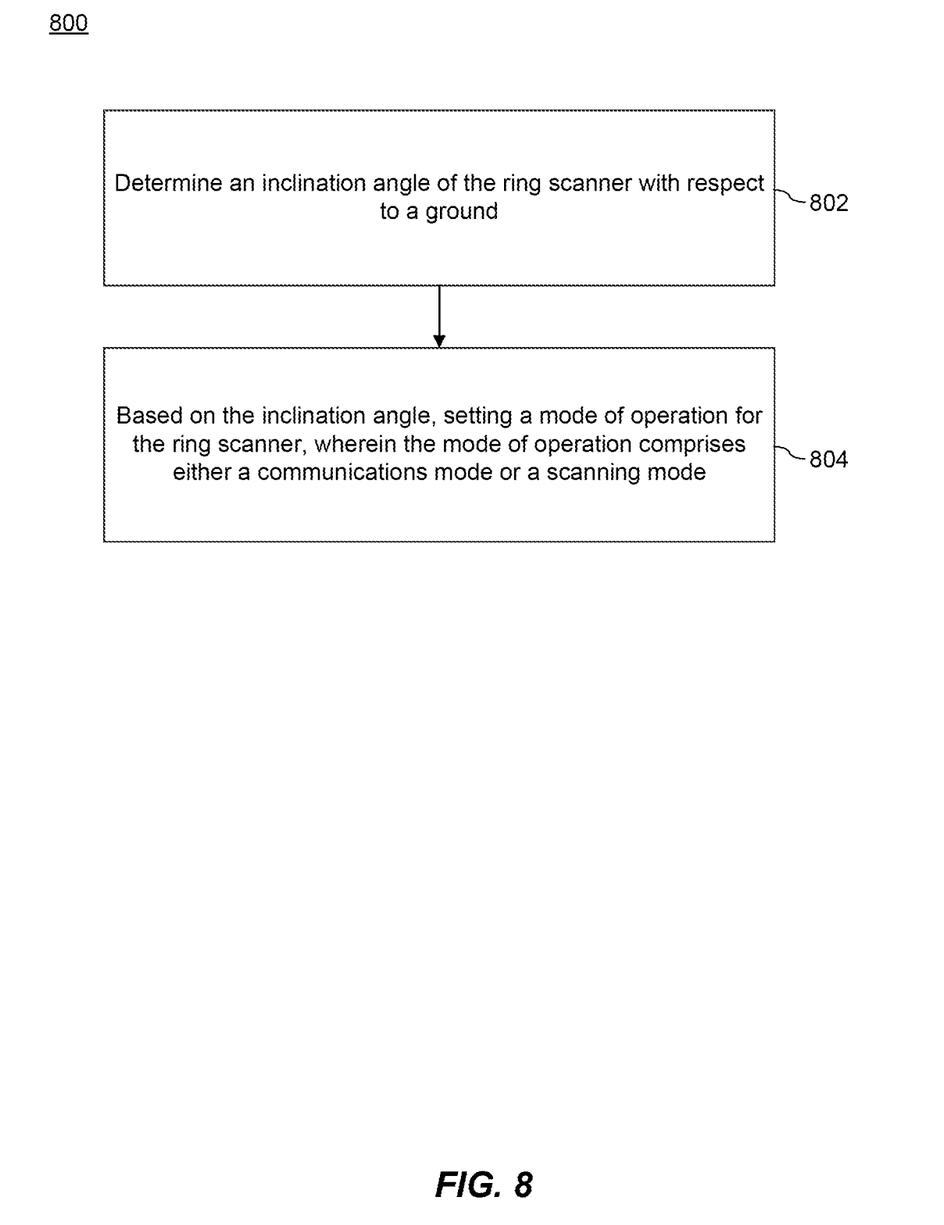
FIG. 8 shows a method of operating the ring scanner to toggle between modes of operation, according to aspects.

FIG. 8 shows a method 800 of operating the ring scanner 112 to toggle between modes of operation, according to aspects. As shown in step 802, method 800 includes determining, by one or more computing devices (e.g., the motion sensor 428 in combination with the processor 402) of a ring scanner 112, an inclination angle of the ring scanner 112 with respect to the ground. At step 804, based on the inclination angle, an operating mode for the ring scanner 112 is set, where the operating mode comprises either a communication mode or a scanning mode. The operations of method 800 are performed by ring scanner 112 in accordance with aspects described above.

The above detailed description and aspects of the disclosed ring scanner 112 are not intended to be exhaustive or to limit the disclosed ring scanner 112 to the precise form disclosed above. While specific examples for the ring scanner 112 are described above for illustrative purposes, various equivalent modifications are possible within the scope of the disclosed ring scanner 112 as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method, process, apparatus, device, product, and ring scanner 112 is cost-effective, highly versatile, and accurate, and may be implemented by adapting components for ready, efficient, and economical manufacturing, application, and utilization. Another important aspect of an aspect of the present disclosure is that it valuably supports and services the historic trend of reducing costs, simplifying systems, and increasing performance.

These and other valuable aspects of the aspects of the present disclosure consequently further the state of the technology to at least the next level. While the disclosed aspects have been described as the best mode of implementing the ring scanner 112, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer implemented method comprising:
   determining, by one or more computing devices of a ring scanner, an inclination angle of the ring scanner with respect to a ground;
   wherein the ring scanner comprises a loop encircling a middle phalanx of a finger enabling the finger to be bent at a proximal interphalangeal joint, wherein the finger is bent towards a left or a right direction allowing the finger to grip the ring scanner;
   wherein the inclination angle is determined based on an angle between the ground and a plane that the middle phalanx is pointing; and
   based on the inclination angle, setting an operating mode for the ring scanner, wherein the operating mode comprises either a communication mode or a scanning mode.

2. The method of claim 1, further comprising setting the operating mode to the communication mode when the inclination angle is equal to or between 90 degrees and 80 degrees relative to the ground.

3. The method of claim 1, further comprising setting the operating mode to the scanning mode when the inclination angle is equal to or between 80 degrees and −30 degrees relative to the ground.

4. The method of claim 1, wherein when the ring scanner is in the communication mode the ring scanner operates as a telephone.

5. The method of claim 1, wherein when the ring scanner is in the communication mode the ring scanner operates as a walkie-talkie.

6. The method of claim 5, further comprising recording, by the one or more computing devices, a voice recording based on selection of a center button of the ring scanner when the ring scanner operates as the walkie-talkie.

7. The method of claim 5, further comprising replaying, by the one or more computing devices, a last transmission received by the ring scanner based on selection of a left button of the ring scanner when the ring scanner operates as the walkie-talkie.

8. A non-transitory computer readable medium having instructions stored thereon that when executed by a ring scanner, causes the ring scanner to perform operations comprising:
   determining, by one or more computing devices of the ring scanner, an inclination angle of the ring scanner with respect to a ground;
   wherein the ring scanner comprises a loop encircling a middle phalanx of a finger enabling the finger to be bent at a proximal interphalangeal joint, wherein the finger is bent towards a left or a right direction allowing the finger to grip the ring scanner;
   wherein the inclination angle is determined based on an angle between the ground and a plane that the middle phalanx is pointing; and
   based on the inclination angle, setting an operating mode for the ring scanner, wherein the operating mode comprises either a communication mode or a scanning mode.

9. The non-transitory computer readable medium of claim 8, wherein the operations further comprise setting the operating mode to the communication mode when the inclination angle is equal to or between 90 degrees and 80 degrees relative to the ground.

10. The non-transitory computer readable medium of claim 8, wherein the operations further comprise setting the operating mode to the scanning mode when the inclination angle is equal to or between 80 degrees and −30 degrees relative to the ground.

11. The non-transitory computer readable medium of claim 8, wherein when the ring scanner is in the communication mode the ring scanner operates as a telephone.

12. The non-transitory computer readable medium of claim 8, wherein when the ring scanner is in the communication mode the ring scanner operates as a walkie-talkie.

13. The non-transitory computer readable medium of claim 12, wherein the operations further comprise recording, by the one or more computing devices, a voice recording based on selection of a center button of the ring scanner when the ring scanner operates as the walkie-talkie.

14. The non-transitory computer readable medium of claim 12, wherein the operations further comprise replaying, by the one or more computing devices, a last transmission received by the ring scanner based on selection of a left button of the ring scanner when the ring scanner operates as the walkie-talkie.

15. A ring scanner comprising:
   a memory configured to store instructions; and
   one or more processors, coupled to the memory and configured to process the stored instructions to:
      determine an inclination angle of the ring scanner with respect to a ground,
      wherein the ring scanner comprises a loop encircling a middle phalanx of a finger enabling the finger to be bent at a proximal interphalangeal joint, wherein the finger is bent towards a left or a right direction allowing the finger to grip the ring scanner;
      wherein the inclination angle is determined based on an angle between the ground and a plane that the middle phalanx is pointing; and
      based on the inclination angle, set an operating mode for the ring scanner, wherein the operating mode comprises either a communication mode or a scanning mode.

16. The ring scanner of claim 15, wherein the one or more processors are further configured to set the operating mode to the communication mode when the inclination angle is equal to or between 90 degrees and 80 degrees relative to the ground.

17. The ring scanner of claim 15, wherein the one or more processors are further configured to set the operating mode to the scanning mode when the inclination angle is equal to or between 80 degrees and −30 degrees relative to the ground.

18. The ring scanner of claim 15, wherein when the ring scanner is in the communication mode the ring scanner operates as a telephone.

19. The ring scanner of claim 15, wherein when the ring scanner is in the communication mode the ring scanner operates as a walkie-talkie.

20. The ring scanner of claim 19, wherein the one or more processors are further configured to:
   record a voice recording based on selection of a center button of the ring scanner when the ring scanner operates as the walkie-talkie; and
   replay a last transmission received by the ring scanner based on selection of a left button of the ring scanner when the ring scanner operates as the walkie-talkie.

* * * * *